(12) United States Patent
Niedrig (10) Patent No.: US 7,509,826 B2
(45) Date of Patent: Mar. 31, 2009

(54) ANTI-THEFT DEVICE FOR VEHICLES STEERED BY A HANDLEBAR

(76) Inventor: Franklin Ferdinand Niedrig, Rue Pierre de Vingle 26, Neuchâtel, NE (CH) 2003

( * ) Notice: Subject to any disclaimer, the term of this patent is extended or adjusted under 35 U.S.C. 154(b) by 258 days.

(21) Appl. No.: 10/545,934

(22) PCT Filed: Feb. 11, 2004

(86) PCT No.: PCT/CH2004/000078

§ 371 (c)(1),
(2), (4) Date: Aug. 18, 2005

(87) PCT Pub. No.: WO2004/074076

PCT Pub. Date: Sep. 2, 2004

(65) Prior Publication Data

US 2006/0169009 A1    Aug. 3, 2006

(30) Foreign Application Priority Data

Feb. 18, 2003    (CH) .................................... 0241/03

(51) Int. Cl.
*B60R 25/02*    (2006.01)
(52) U.S. Cl. .............................. 70/186; 70/185; 70/233
(58) Field of Classification Search ........... 70/182–186, 70/233
See application file for complete search history.

(56) References Cited

U.S. PATENT DOCUMENTS

| 590,803 | A | * | 9/1897 | Clarry | 70/236 |
| 601,290 | A | * | 3/1898 | Tryon | 70/185 |
| 623,084 | A | * | 4/1899 | Houghton | 70/185 |
| 1,155,902 | A | * | 10/1915 | Edey | 70/184 |
| 1,168,701 | A | * | 1/1916 | Babbitt | 70/252 |
| 1,170,335 | A | * | 2/1916 | Risdon | 70/187 |
| 1,206,944 | A | * | 12/1916 | Terry | 70/185 |
| 1,251,987 | A | * | 1/1918 | McFarland | 70/185 |
| 1,295,810 | A | * | 2/1919 | Stanley | 70/213 |
| 1,305,786 | A | * | 6/1919 | Estberg | 70/185 |
| 1,384,707 | A | * | 7/1921 | Miller | 70/185 |

(Continued)

FOREIGN PATENT DOCUMENTS

DE    3439412    5/1986

(Continued)

*Primary Examiner*—Suzanne D Barrett
(74) *Attorney, Agent, or Firm*—Clifford W. Browning; Krieg DeVault LLP (57) ABSTRACT

An anti-theft device for vehicles steered by means of a handlebar fixed to a fork (2, 3) accepting a steered wheel, comprising first means (12) of connection with the handlebar and second means (4, 5, 6) of connection with the fork, coupling means (7, 11, 18, 19, 20, 24) between the said first and second connection means, a two-position actuation device (21, 22, 23) locking any relative movement between the first and second connection means in the position of use of the vehicle and allowing free rotation between the said first and second connection means in the engaged position of the said anti-theft device, the actuation device comprising an interlocking mechanism (18, 21, 26), locked when the actuation device is in the anti-theft position and activated when the actuation device is in the position of use, independently of the relative positions of the handlebar and fork.

19 Claims, 7 Drawing Sheets

U.S. PATENT DOCUMENTS

| | | | | |
|---|---|---|---|---|
| 1,408,652 | A | * | 3/1922 | Steinberg .................. 70/185 |
| 1,736,900 | A | * | 11/1929 | Carpenter .................. 70/185 |
| 1,881,346 | A | | 10/1932 | Bell et al. |
| 1,917,609 | A | * | 7/1933 | Smith .................. 70/252 |
| 2,032,821 | A | * | 3/1936 | Waits .................. 70/185 |
| 2,081,778 | A | * | 5/1937 | Taman .................. 70/187 |
| 2,139,984 | A | | 12/1938 | George et al. |
| 2,143,502 | A | * | 1/1939 | Taman .................. 70/233 |
| 2,208,849 | A | * | 7/1940 | Manton .................. 70/184 |
| 2,576,773 | A | * | 11/1951 | Buxton .................. 70/185 |
| 3,863,472 | A | | 2/1975 | Klingfus |
| 4,509,349 | A | | 4/1985 | Partridge |
| 5,085,063 | A | * | 2/1992 | Van Dyke et al. .......... 70/218 |
| 5,279,137 | A | * | 1/1994 | Orbell .................. 70/218 |
| 6,076,381 | A | | 6/2000 | Green |
| 2003/0107479 | A1 | * | 6/2003 | Evans .................. 340/427 |
| 2004/0119583 | A1 | * | 6/2004 | Linden et al. .......... 340/432 |
| 2005/0081580 | A1 | * | 4/2005 | Nakai et al. .......... 70/186 |
| 2006/0005586 | A1 | * | 1/2006 | Smyczek et al. .......... 70/25 |
| 2006/0162407 | A1 | * | 7/2006 | Kuhblank .................. 70/233 |

FOREIGN PATENT DOCUMENTS

| | | |
|---|---|---|
| DE | 3930143 | 3/1991 |
| DE | 4222526 | 11/1992 |
| DE | 4223530 | 12/1993 |
| DE | 19617028 | 10/1997 |
| EP | 0737614 | 10/1996 |
| FR | 2695604 A | 3/1994 |
| JP | 2000 289667 A | 2/2001 |

\* cited by examiner

ANTI-THEFT DEVICE FOR VEHICLES STEERED BY A HANDLEBAR

Applicant claims foreign priority benefits under 35 U.S.C. §§119(a)-(d) or (f), or §365(b) of Switzerland Patent Application No. 0241/03, filed Feb. 18, 2003.

The present invention concerns an anti-theft device for vehicles steered by means of a handlebar acting on a fork accepting a steered wheel, the said device comprising first means of connection with the handlebar and second means of connection with the fork, means of coupling between the said first and second connection means, and an actuation device with two positions, a position of use of the vehicle locking any relative movement between the first and second connection means and an anti-theft device allowing free rotation between the said first and second connection means.

The invention concerns in particular an anti-theft device of this type, intended for bicycles.

Many anti-theft devices for bicycles have been described in the prior art. It is possible to cite, by way of examples, those described by the documents U.S. Pat. No. 6,076,381, DE 19617028, U.S. Pat. Nos. 4,509,349, 3,863,472, EP 0737614, DE 4223530, DE 4222526, DE 3930143 or DE 3439412. These devices have the common characteristic of locking the rotation of the handlebar and fork when the anti-theft device is activated. In general, these devices act by locking the rotation of the stem or steering column of the fork, which is itself fixed to the handlebar, for example by making a locking part enter a slot in the steering column under the effect of a key.

A major drawback of such systems lies in the fact that, if a thief attempts to make the handlebar turn when the anti-theft system is engaged, this attempt results in mechanical stresses on the part or parts providing the locking. However, the handlebar of a bicycle or moped through its configuration exerts a high lever arm on the steering column and therefore on any part locking the rotation thereof. If such attempts are exerted violently, these parts may be deformed and, even if the anti-theft device is not successfully forced, it may nevertheless be twisted and/or damaged, which may make it impossible to subsequently unlock it by means of the key provided for this purpose, or prevent its subsequent normal functioning.

Damage to these anti-theft devices may also occur accidentally during a clumsy attempt to use the vehicle, by any person without the intention of theft, since it is in general impossible to determine, without prior careful examination, whether or not the anti-theft device is engaged.

To mitigate these defects, anti-theft devices of the type defined at the start, such as the one described by U.S. Pat. No. 2,139,984 or the one described by JP 2000-289667, have already been proposed.

Unlike the devices cited above, in which all the means of connection between the handlebar and the fork form a rigid whole, this type of anti-theft lock makes it possible to release the handlebar from the fork by virtue of a reversible coupling bolt, arranged so that, when the anti-theft device is activated, a rotation of the handlebar transmits neither movement nor force to the fork. Conversely, in the position of use of the vehicle, the bolt couples and rotationally connects the handlebar and the fork column.

As a result, in the activated position of the anti-theft device, the handlebar and fork do not remain aligned, but can turn freely with respect to each other, adopting any relative positions when the vehicle is parked, which is immediately visible to any user or thief approaching the vehicle, and may exert a dissuasive effect on them.

However, the known devices of the prior art are not free from defects:

In the known anti-theft devices of this type, the passage from the anti-theft position to the position of use requires a perfect alignment of the bolt with its conjugate housing, failing which the lock key cannot be turned. The user is therefore obliged to align the fork with the handlebar, to attempt to hold these and the frame in place, and to turn the key. All these operations are extremely inconvenient and of such a nature as to incite consumers to refuse this type of device.

The handlebar of a two-wheel vehicle generally carry the ends of several cables, for example brake cables. A disappointed thief may be tempted by an act of vandalism: a rotation of several turns of handlebar free to turn in the anti-theft position will pull away these cables.

Finally, a manipulation of the key by inadvertence or stupidity may be feared, when the vehicle is in use, which would almost obligatorily cause an accident.

A first aim of the invention is to propose an anti-theft device of the type defined at the start, in particular for bicycles, but also mopeds, which allows easy activation/deactivation of the anti-theft function.

Another aim of the invention is to propose an anti-theft device of this type, which does not allow or at least dissuades damage to the vehicle by unwanted rotations of the handlebar when the anti-theft device is activated.

Another aim of the invention is to propose an anti-theft device that cannot be neutralised or removed without having a specialised tool equipment.

Another aim of the invention is to propose an anti-theft device whose activation cannot be effected inadvertently during the use of the vehicle.

Another aim of the invention is to propose an anti-theft device that can be adapted for the cost of minor modifications on pre-existing vehicles.

One object of the invention is therefore an anti-theft device of the type defined at the start, the said actuation device comprising an interlocking mechanism, locked when the said actuation device is in the anti-theft position, and activated when the actuation device is in the position of use, independently of the relative positions of the handlebar and fork.

Another object of the invention is an anti-theft device of the type defined at the start, having travel limiting means for limiting the magnitude of the said free rotation to an arc of a circle, arranged inside the said anti-theft device.

Another object of the invention is an anti-theft device of the type defined at the start comprising a safety mechanism interacting with the said coupling means, preventing passage from the position of use to the anti-theft position in the absence of any actuation of the said safety device by the user.

Another object of the invention is an anti-theft device of the type defined at the start comprising an acoustic alarm device activated in the anti-theft position and deactivated in the position of use, and detecting the relative movements of the handlebar with respect to the fork, emitting an audible signal after the detection of a predetermined number of the said movements.

Preferred embodiments of the anti-theft device according to the invention are defined in the dependent claims.

Other characteristics and advantages of the invention will become clear to a person skilled in the art from the following description of preferred embodiments, in relation to the drawing, in which.

Figure 1:
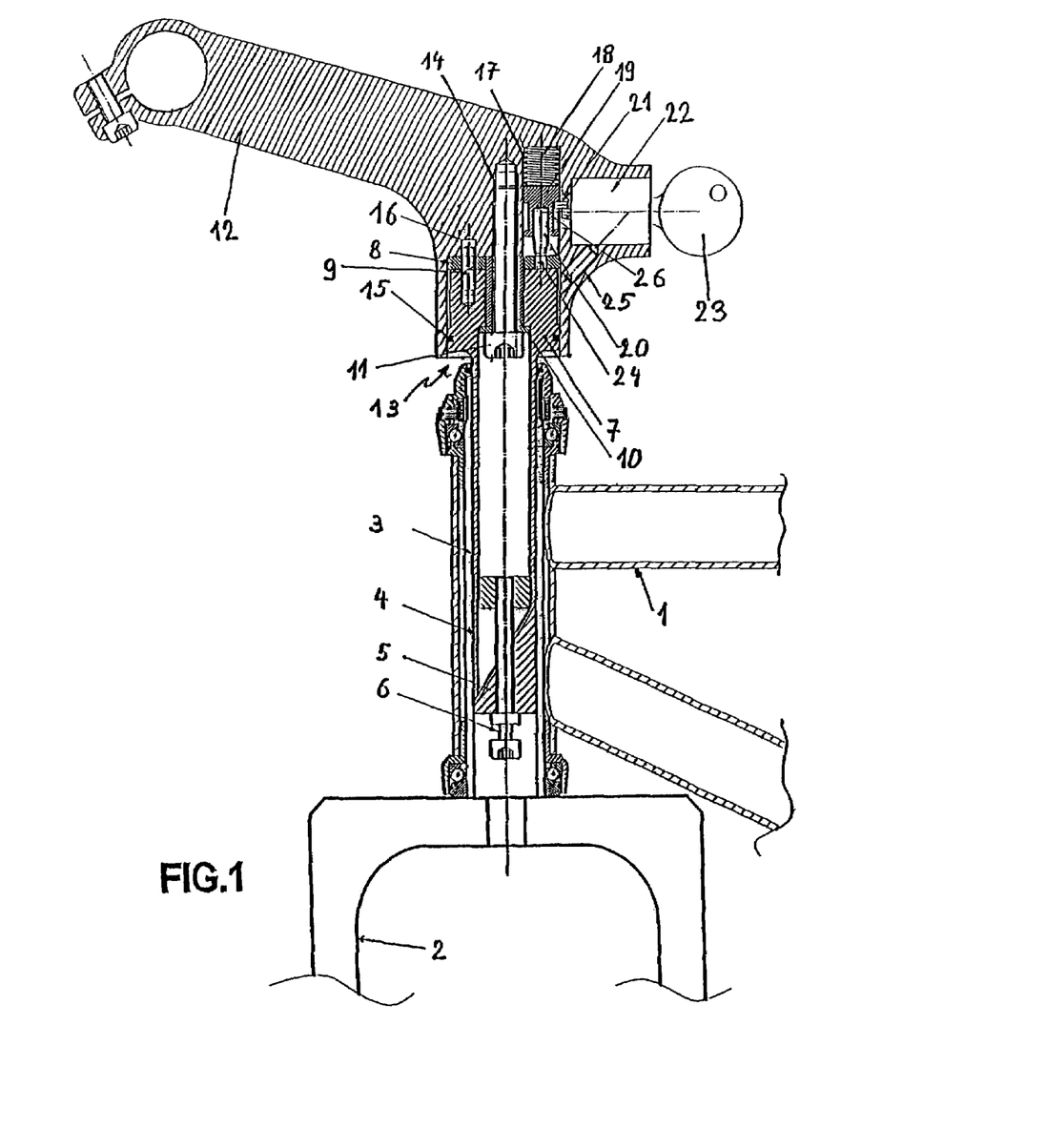
FIG. 1 is a partial section of a bicycle frame, in its mid-plane, showing a first embodiment of the anti-theft device, with the stem in line with the bicycle frame, but the fork turned by approximately 90° with respect to the position of use.

FIG. 1 shows a partial section, in its mid-plane, of a bicycle frame 1, in which a fork 2 is journalled in a known manner. The fork comprises a fork column 3 in which the bottom part of a stem column 4 is housed. The bottom part of the stem column 4 can be locked in rotation and translation inside the fork column 3 by means of a spacing device 5 with screw 6, known in the prior art. The screw 6 can be chosen so that its head breaks under the action of a clamping instrument, when sufficient clamping is achieved for the stem column to be locked inside the fork column. In place of a screw with a breaking head, the spacing device 5 can also use a nut with a head having a form such that it can be tightened/loosened only with a special tool. In both cases, the stem can be removed only in the context of a workshop having a specialised tool equipment.

The stem column 4 is surmounted by a broadened cylindrical stem column head 7. The column head 7 carries a locating ring 8 to which it is fixed. The locating ring 8 and the column head 7 have in them an eccentric bore that enables them to be connected together by means of a pin 9. The column head 7 and the locating ring 8 also have passing through them an axial bore 10 that allows passage of a fixing screw 11. The fixing screw 11 makes it possible to connect the column head 7 to a stem head 12. The stem head 12 has a housing 13, in the form of a cylindrical bore, conjugate with the shape of the column head 7, and extended by a threaded bore 14 coaxial with the bore 10, in order to receive the screw 11. A seal 15 placed in the groove of the column head 7 provides the seal for the housing 13.

The bottom of the housing 13 has a hollow 16, cut out in an arc of a circle whose centre coincides with the axis of the stem column, which accepts the protruding end of the pin 9, which limits the magnitude of the relative rotation movement between the stem head 12 and the stem column 4 to this arc of a circle, for example to 180°. To facilitate this rotation, the contact surfaces between the column head 7 and the housing 13 can be lubricated. In particular, the locating ring 8 can carry a thin layer of solid lubricant, for example a PTFE. The device limiting the end of travel consisting of the stop pin 9 and the hollow 16 prevents excessive rotation of the handlebar with respect to the fork, which would risk damaging the brake conduits and the transmission.

In the bottom of the housing 13 there is hollowed out a second off-centre housing 17, the bottom of which accepts a spring 18. The spring 18 bears on the rear face of a slide 19, carrying a coupling pin 20, the free end of which is conical in shape. The slide 19 has a lateral hollow 26 in which there enters a protruding eccentric 21 of a half-turn lock barrel 22, actuated by means of a key 23.

The locating ring 8 has a hole 24, with a diameter slightly greater than that of the free end of the pin 20, arranged so that the axis of the hole and the axis of the pin can coincide and so that the pin 20 can enter the hole 24 under the action of the key 23. On initial assembly in the workshop, the fork is then aligned with the handlebar—by rotation through 90° in the case illustrated by FIG. 1—and the screw 6 is tightened.

The anti-theft device functions in the following manner. In the anti-theft position, as depicted in FIG. 1, the eccentric 21 is situated above the axis of the barrel 22, bears on the edge of the lateral hollow 26 and pushes the spring 18 in the bottom of the housing 13. When the key 23 is turned so that the eccentric 21 comes below the axis of the lock barrel, the return spring 18 pushes the slide 19 downwards. If the handlebar, free to turn in the anti-theft position, is not perfectly aligned with the fork, the free end of the pin 20 abuts against the top surface of the locating ring, which does not prevent the rotation of the key 23, the eccentric 21 being free to move in the lateral hollow 26. The interlocking between the stem head and the stem column takes place as soon as, by an appropriate rotation of the handlebar or fork, the pin 20 is aligned with the hole 24: the spring 18 then pushes the pin 20 in the hole 24, so that the stem column 4 and the stem head 20 are locked rotationally with respect to each other. The conical shape of the pin 20 entering the hole 24, combined with the thrust of the spring 18, eliminates any clearance between these parts, even if the key is not turned perfectly into the position of use of the bicycle. Any action on the handlebar is then transmitted to the fork and the vehicle can be used normally. When the key 23 is once again turned by a half turn, the eccentric comes above the axis of the barrel and, by pushing the slide 19, it extracts the pin 20 from the hole 24, compressing the spring 18. The stem head 12 can then turn freely with respect to the head 7 of the stem column 4. A rotation of the handlebar is therefore no longer transmitted to the stem column 4 and, therefore, to the fork, so that the vehicle cannot be steered.

A person skilled in the art will observe that no unwanted and/or violent movement of the handlebar is in a position to damage the pin 20, the locating ring 8 or the lock 22, given that these parts are disconnected in the anti-theft position.

The lock body 22 is locked inside its housing, provided laterally in the stem head, by a locking screw 25 which is accessible only from the axial housing 13, that is to say only if the device is entirely dismantled. Such a dismantling can be effected only if the clamping device 5 is itself dismantled, which, having regard to the rupture of the screw 6 at the time of initial mounting of the fork, requires specialised tooling and can under no circumstances be executed in a public place without attracting attention.

The whole of the anti-theft device is therefore integrated in the stem that connects the fork to the handlebar and is not accessible to a third party not having a specialised tooling.

Figure 2:
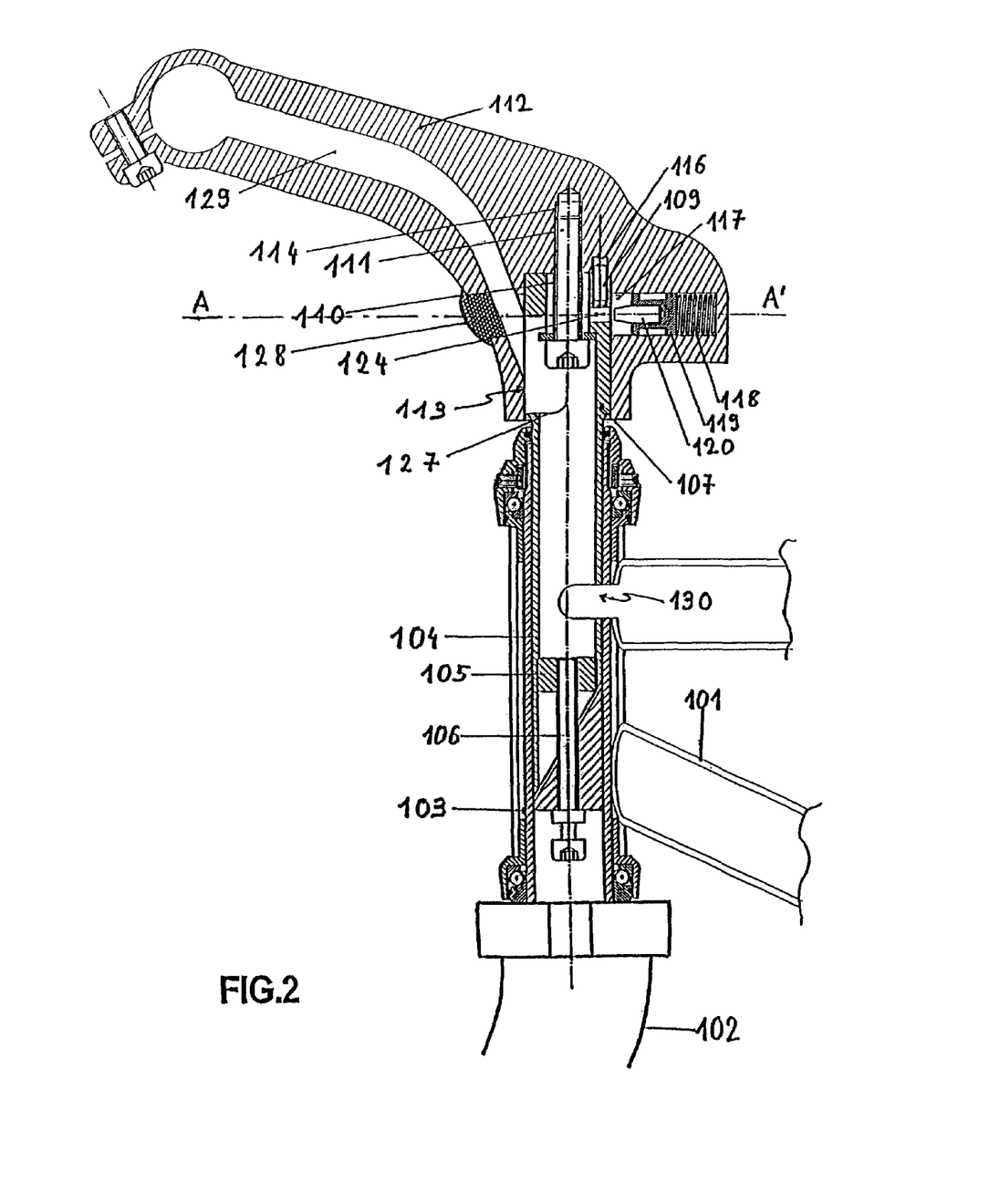
FIG. 2 is a partial section of a bicycle frame, in its midplane, showing a second embodiment of the anti-theft device, with the stem in line with the bicycle frame and the fork in the position of use.
Figure 3:
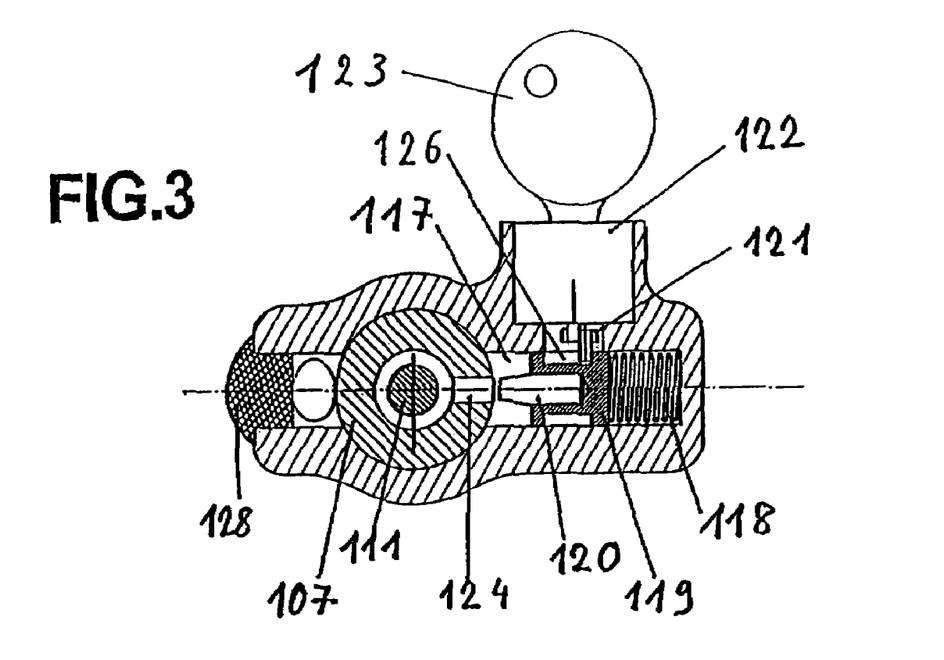
FIG. 3 is a section along the line A-A' in FIG. 2.

FIGS. 2 and 3 show a second embodiment in which the brake control cables and the transmission are arranged inside the device and are thereby protected from petty vandalism.

In a similar manner to FIG. 1, FIG. 2 shows a partial section in its mid-plane of a bicycle frame 101 in which a fork 102 is journalled. The fork comprises a fork column 103 in which the bottom part of a stem column 104 is housed, which is locked inside the fork column 103 by a separation device 105 with screw 106 similar to that depicted in FIG. 1.

The stem column 104 is surmounted by a partially hollow cylindrical column head 107. The column head 107 has in it an eccentric bore that receives a pin 109. The column head 107 also receives an axial bore 110 to permit assembly with a stem head 112 by means of a fixing screw 111, in a similar manner to the first embodiment. The stem head 112 has a housing 113 in the form of a cylindrical bore, conjugate with the shape of the column head 107 and extended by a corresponding threaded bore 114 coaxial with the bore 113. The bottom of the housing 113 has a hollow 116, cut in an arc of a circle, coaxial with the axis of the stem column, which receives the protruding end of the stop pin 109, in order to limit the magnitude of the relative rotation movement between the stem head 112 and the stem column 104.

In the lateral wall of the housing 113 there is hollowed out a second housing 117, the bottom of which accepts a spring 118 bearing on the rear face of a slide 119 carrying a coupling pin 120, the free end of which is conical in shape. The piece 119 has a lateral hollow 126 in which there can be inserted a protruding eccentric 121 of a lock barrel 122, which is itself arranged in a housing in a lateral position and whose axis is perpendicular both to the axis of the stem column and to the axis of the housing 117, as shown by FIG. 3. The eccentric 121 that is inserted in the hollow of the slide 119 makes it possible to actuate the pin 120 in a similar manner to the first embodiment. The column head 107 has a lateral hole 124, which comes opposite the pin 120 when the handlebar (not shown) come into alignment with the fork. The interaction between the pin 120, and therefore the stem head 112, on the one hand, and the hole 124, and therefore the column head 107, on the other hand, is identical to that described for the first embodiment.

In this embodiment, the stem head is hollow and has a pipe 129 that makes it possible to make the brake and transmission control conduits pass from the handlebar as far as the frame 101, the top branch of which has a corresponding opening 130, passing via a lateral opening 127 in the column head inside the stem column. A plug 128 closes off the opening in the stem head caused by the hollowing out of the housing 117.

A person skilled in the art will observe that the anti-theft device consisting of the stem head/stem column assembly integrating the means of connecting, coupling and actuating the first and second embodiments can without anything else replace an original stem of a bicycle.

Figure 4:
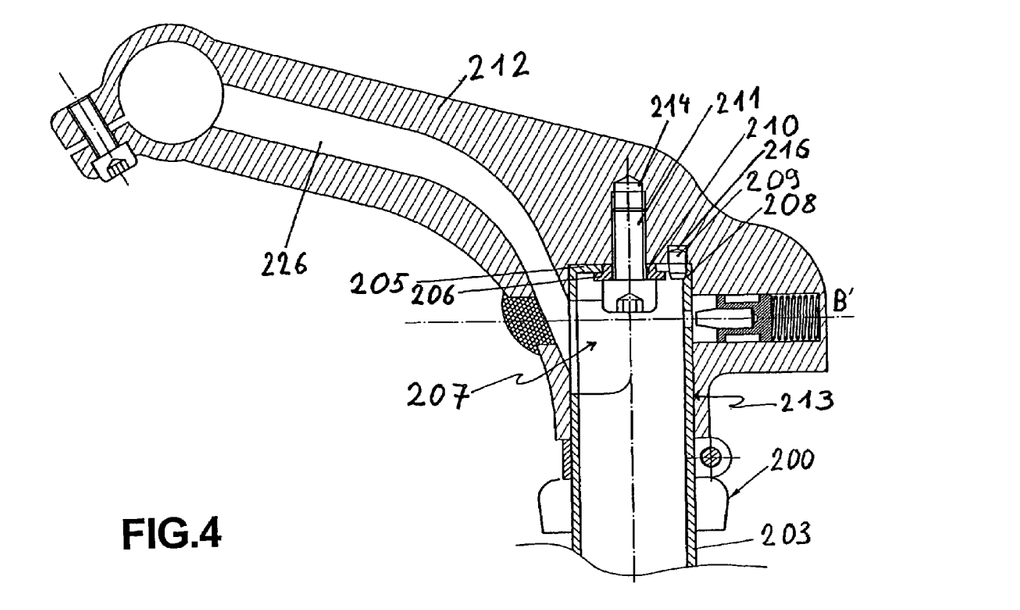
FIG. 4 is a vertical section showing a third embodiment of the anti-theft device, applied to a handlebar/fork fixing of the "head-set" type.
Figure 5:
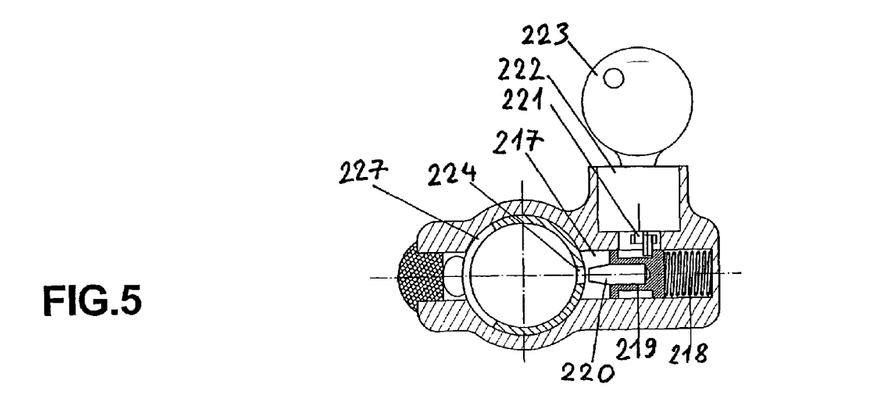
FIG. 5 is a section along the line B-B' in FIG. 4.

FIGS. 4 and 5 show a third embodiment of the anti-theft device adapted to a fixing 200 of the "head-set" type. The stem head 212 is similar to the stem head 112. A housing 213, the diameter of which is adapted to that of a fork column, replaces the housing 113. The head 207 of the fork column 203 engages directly in the housing 213 of the stem head. The fork column terminates in a front face 205 with an axial hole 210 in it through which there pass a clamping ring 206 and a fixing screw 211, which fixes the fork column 203 in a threaded bore 214 in the stem head, which axially extends the housing 213.

For adapting the anti-theft device, the front end 205 of the fork column is pierced close to one of its edges, opening up the lateral wall, so that the latter forms at this point a shoulder 208 that limits the sinking in of a stop pin 209, the other end of which enters a hollow in an arc of a circle 216 similar to the hollow 116 of the second embodiment. The lateral wall of the fork column also has in it a hole 224 opposite which a coupling pin with a conical head 220 is placed when the fork and handlebar are aligned. The method of actuating the pin 220 carried by the slide 219 by means of the lock 222 and spring 218 is identical to that of the second embodiment.

The lateral wall of the fork column also has, on the opposite side to the hole 224, a wide cut-out 227 that is placed opposite the internal pipe 226 in the stem head in order to allow the brake and transmission cables to pass.

A person skilled in the art will observe that the anti-theft device consisting of the stem head 212, with the lock and pins, can easily replace the original stem of a bicycle with "head-set" fixing, at the cost of minimum adaptation, namely the piercing of holes in the fork column.

The anti-theft device according to the invention can be provided with a safety mechanism preventing decoupling between the handlebar and fork when the anti-theft device is manoeuvred from its position of use, unless additional operation, conscious and intentional, is performed by the user at the same time as he actuates the actuation device in order to pass into the anti-theft position. FIGS. 6, 7, 8 and 9 illustrate a fourth embodiment, with such a safety mechanism adapted to lock coupling means identical or similar to those illustrated by FIGS. 1 to 5. For reasons of simplification in teaching, the parts used for connection and limiting the rotation between fork and handlebar, which are not directly necessary for an understanding of this mechanism, have been omitted in FIGS. 6 and 8.

Figures 6, 7:
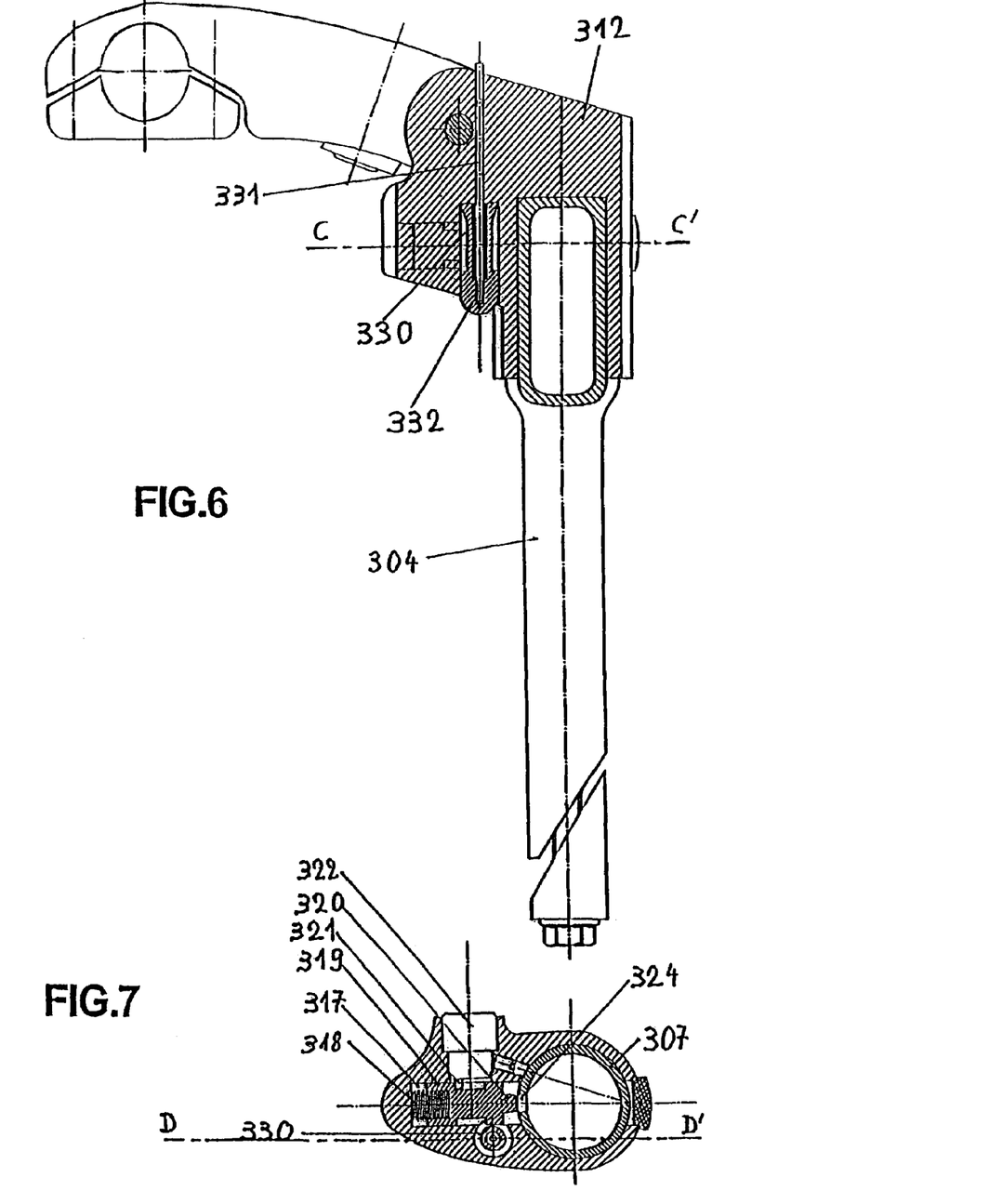
FIG. 6 and FIG. 8 are vertical sections along the line D-D' in FIGS. 7 and 9 respectively, showing a fourth embodiment of the anti-theft device provided with a safety mechanism.
FIGS. 7 and 9 are sections along the line C-C' in FIGS. 6 and 8 respectively.
Figure 8:
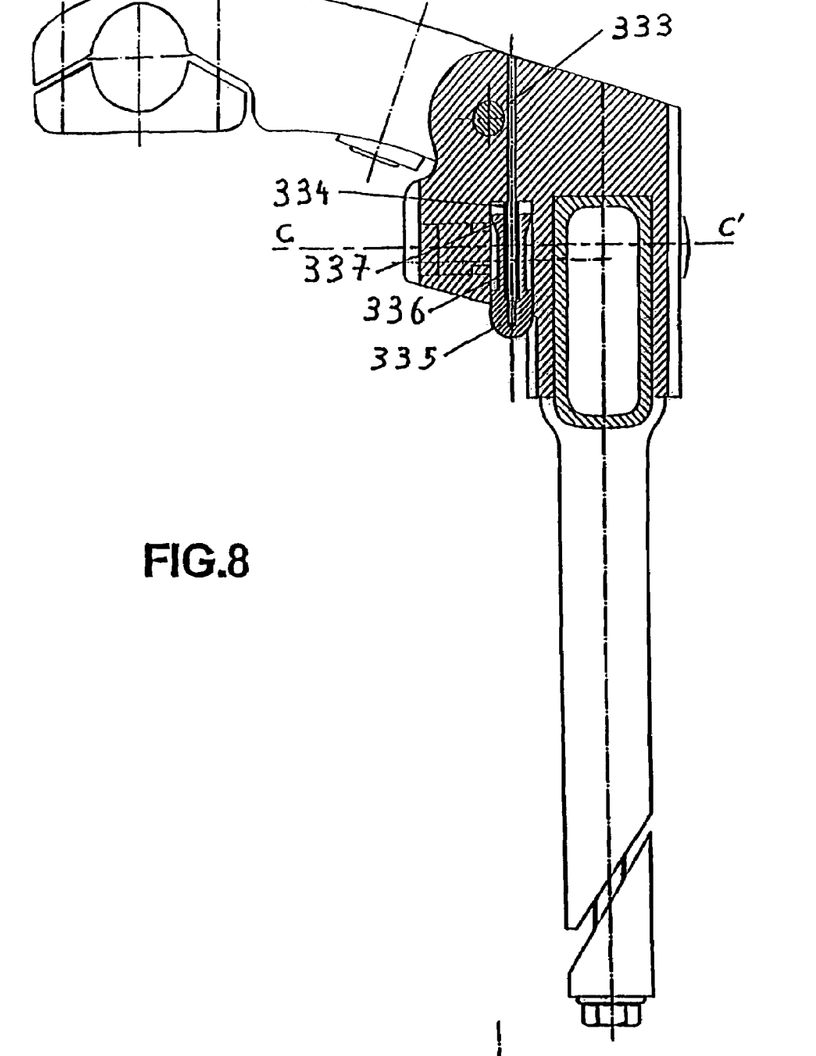
Figure 9:
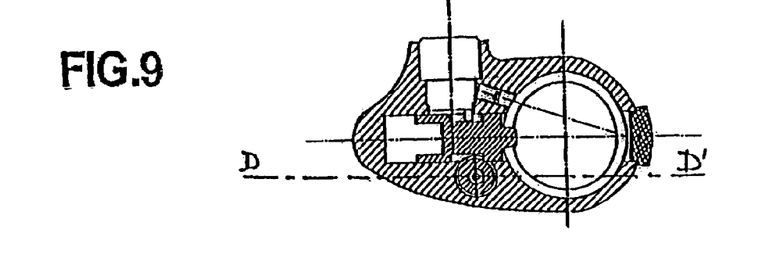

The stem head 312 shown in FIGS. 6 to 9 receives an additional bore forming a housing 330, the axis of which is perpendicular to the axis of the housing 317, in which a slide 319 slides. As shown by FIGS. 7 and 9, the slide comprises a conical coupling head 320, the whole of the slide being in one piece. The slide could also carry a coupling pin as in the embodiments described previously. The slide is actuated by a spring 318 and an eccentric 321 of a lock 322 in the same way as described previously.

The housing 330 is extended by a drill hole 331 coaxial with the axis of the housing, opening out on the top surface of the stem head. The housing accepts a safety button 332. This button itself has in it a bore coaxial with the axis of the housing, which receives a rod 333 sufficiently long to pass through the drill hole 331, and a return spring 334 surrounding the rod. As shown in FIGS. 6 and 8, the safety button 332 can slide in the housing under the effect of the return spring 334 between a high position shown in FIG. 6, in which the rod 333 projects beyond the surface of the stem head, and a low position, in which the rod does not project beyond this surface. The safety button has a rounded cylindrical head 335 that projects beyond the housing more or less depending on the position of the button, as shown by FIGS. 6 and 8, a thinned cylindrical central part 336 and a frustoconical base 337. The spring 334 has a tendency to push the button 332 out of its housing but this movement is limited by the interaction between the button 332 and the slide 319. This interaction is itself due to the relative arrangement of the housings 317 and 330.

As shown by FIGS. 8 and 9, when the actuation device is in the position of use, the frustoconical part 337 of the button 332 enters the lateral hollow in the slide 319. In this position, this frustoconical part of the button prevents the retraction of the front part of the slide and therefore the withdrawal of the head 320 of the slide from the hole 324 of the head 307 of the stem column 304. Likewise, the button 332 prevents the complete rotation of the key of the lock 322, whilst not preventing a partial but inoperative rotation thereof. In order to be able to effect a complete rotation of the key and therefore of the eccentric 321 and consequently to make the slide withdraw towards the bottom of its housing and to disengage it from the hole 324 in the column head, the user is obliged to simultaneously press the button 332 into its housing 330, as illustrated by FIGS. 6 and 7. This double operation requires the use of both hands, whilst performing two different actions. A passage from the position of use to the anti-theft position inadvertently is therefore excluded.

In the anti-theft position illustrated by FIGS. 6 and 7, the thick front part of the slide 319 is opposite the thinned part 336 of the button 332, whilst the frustoconical portion 337 thereof is locked at the bottom of its housing by the slide. In this situation, the rod 333 is in a protruding position. The end of the rod can carry a coloured mark to make this situation more visible to the user. The return from the anti-theft position to the position of use of the vehicle does not require any intervention on the button 332. The user simply turns the key and perfects the handlebar-fork alignment. As soon as this is obtained, the slide 319 engages in the hole 324 under the effect of the spring 318. The lateral hollow in the slide comes opposite the button 332, which drops again automatically under the effect of the spring 334. The particular geometry of the frustoconical part 337 of the button 332, which bears on the rear of the thick front part of the slide 319, helps to eliminate any clearance between slide head and conjugate hole 324.

Figure 10:
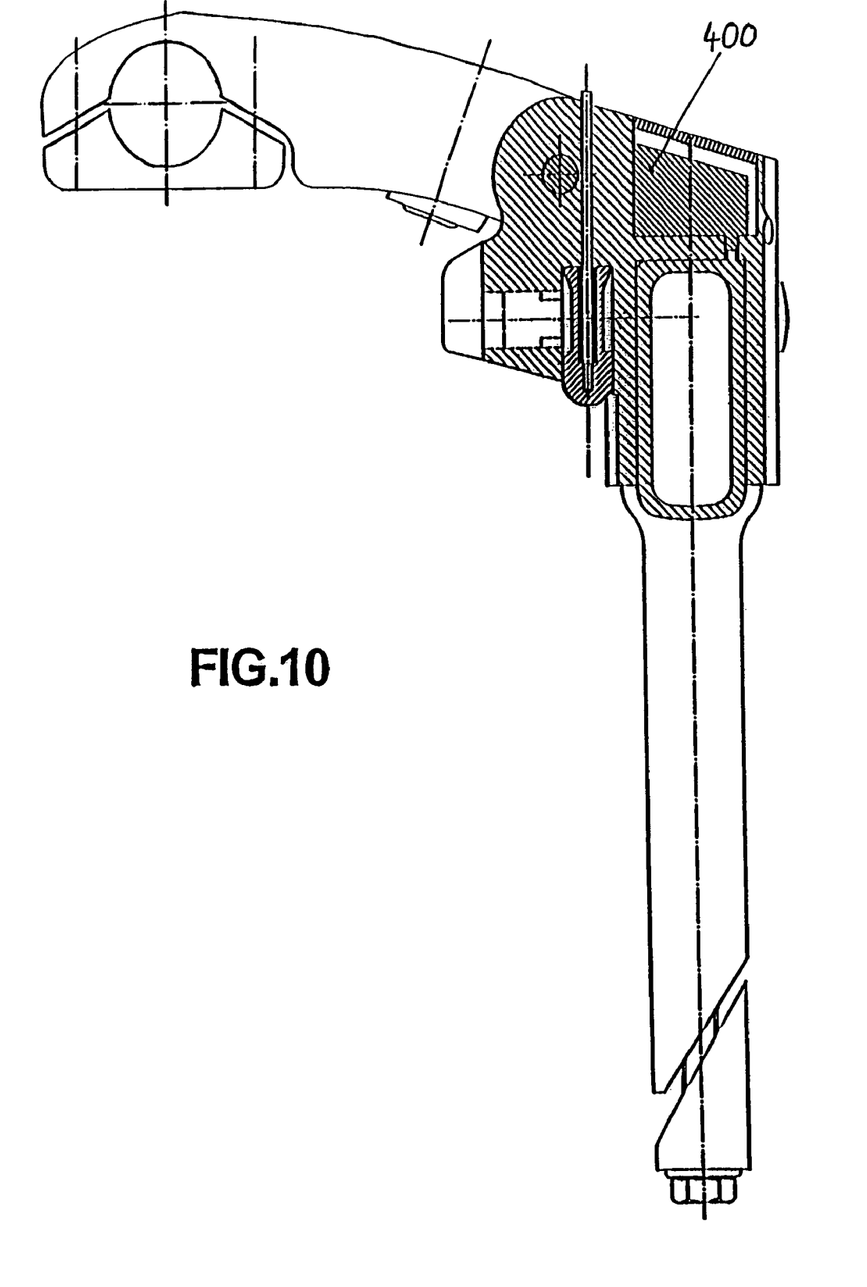
FIG. 10 is a schematic view in vertical section of a fifth embodiment.

FIG. 10 illustrates schematically a fifth embodiment of the anti-theft device, comprising the elements of the fourth embodiment described previously and also integrating an acoustic alarm device. The alarm device can be housed in a housing depicted schematically and designated by the reference 400 in FIG. 10. The housing accepts a power source such as a battery, a noise generator such as a whistle or a small siren functioning with the power of the battery, and an electronic processor managing the whole. The alarm device also comprises a contact sensor detecting, at the end of travel of the handlebar, interaction between a stop pin and the end of a hollow similar to one of the pins 9, 109 or 209 and to one of the hollows 16, 106, 206 described previously. This alarm device is activated and deactivated by the rotation of the key of the lock previously described. It is in the activated position when the lock is in the anti-theft position. The sensor then detects the rotations between stem head and column, that is to say the relative movements between handlebar and fork. The electronic processor triggers the noise generator after having detected a predetermined and programmable number of movements of the handlebar, representing an attempt at theft or vandalism.

Advantageously, the hollow+stop pin assembly allows free travel with an amplitude of around ≃180°, that is to say ≃90° on each side of the handlebar/fork alignment position. In this way, the device according to the invention not only has an anti-theft device function but also facilitates the storage of a two-wheel vehicle in a narrow place since the handlebar can be put parallel with the front wheel.

The invention claimed is:

1. An anti-theft device for vehicles steered by means of handlebar fixed to a fork accepting a steered wheel, comprising first means of connection with the handlebar, second means of connection with the fork, means of coupling between the said first and second connection means, and an actuation device comprising two positions, a position of use of the vehicle locking any relative movement between the said first and second connection means and an anti-theft position allowing free rotation between the said first and second connection means, wherein said anti-theft device further comprises a safety mechanism, which can be actuated separately and independently from said actuation device and which interacts with said coupling means, preventing passage from the position of use to the anti-theft position in the absence of an actuation of the said safety mechanism in addition to the actuation of said actuation device by a user.

2. An anti-theft device according to claim 1, wherein the said first connection means comprise a stem head having a cylindrical housing accepting a conjugate cylindrical head of a column and in that the said stem head carries a coupling pin with a spring, actuated by the said actuation device, the said coupling pin being configured so as to engage in a conjugate hole in the said column head.

3. An anti-theft device according to claim 2, wherein the said actuation device comprises a half-turn lock housed in the said stem head, the rotation of which in one direction makes the said coupling pin emerge from the said conjugate hole in the column head and whose rotation in the other direction releases a spring tending to make the said coupling pin enter the said hole in the said column head.

4. An anti-theft device according to claim 2, wherein the said coupling pin has a conical profile and in that the said column head carries a locating ring with a conical drilling with a shape conjugate with the shape of the pin.

5. An anti-theft device according to claim 3, wherein the lock is mounted in the body of the stem head by means accessible solely from the inside of the said cylindrical housing in the stem head.

6. An anti-theft device according to claim 4, wherein the lock is mounted in the body of the stem head by means accessible solely from the inside of the said cylindrical housing in the stem head.

7. An anti-theft device according to claim 2, wherein the said column head forms part of a stem column provided with means for being mounted in a fork column.

8. An anti-theft device according to claim 7, wherein the said stem column is mounted in the fork column by means of a screw, the head of which can be broken at the time of assembly.

9. An anti-theft device according to claim 2, wherein the said column head forms an integral part of a fork column.

10. An anti-theft device according to claim 1, further comprising travel limiting means for limiting the magnitude of the said free rotation to an arc of a circle, arranged inside the said anti-theft device.

11. An anti-theft device according to claim 1, further comprising travel limiting means for limiting the magnitude of the said free rotation to an arc of a circle, arranged inside the said anti-theft device, and wherein the said travel limiting means comprise a stop pin and a hollow in an arc of a circle arranged respectively inside the said cylindrical housing of the stem head and on the said column head.

12. An anti-theft device according to claim 2, wherein the said safety mechanism comprises a button with a spring preventing the said coupling pin from disengaging from the said conjugate hole in the said column head.

13. An anti-theft device according to claim 1, further comprising an acoustic alarm device activated in the anti-theft position and deactivated in the position of use, detecting the relative movements of the handlebar with respect to the fork, emitting an audible signal after detection of a predetermined number of the said movements.

14. An antitheft-device according to claim 1, wherein said actuation device comprises a return spring acting pushing a slide, said slide comprising a coupling pin designed to engage with a hole so as to lock, in said position of use, any relative movement between the steered wheel and the fork, and wherein said actuation device further comprises an excentric being partially free to move in a lateral hole in said slide, so that the actuation device can be actuated even when the steered wheel and the fork are not aligned in the anti-theft position.

15. The anti-theft device of claim 1, characterised in that said actuation device comprises an interlocking mechanism, locked when the said actuation device is in the anti-theft position and activated when the actuation device is in the position of use, independently of the relative positions of the handlebar and fork.

16. The anti-theft device of claim 1, characterised in that in said anti-theft position, the actuation device can be actuated for activating said actuation device and for passage to the use position even if the handlebar and the fork are not aligned.

17. The anti-theft device of claim 1, wherein said actuation device comprises a key to switch between the position of use and the anti-theft position, wherein the said actuation device comprises an interlocking mechanism, which enables the key to be turned to switch from the anti-theft position to the position of use, even if the steered wheel is not aligned with the fork; and wherein,
   after turning of the key to switch to the position of use with the steered wheel and the fork not being aligned, the position of use is obtained by appropriate rotation of the handlebar or fork.

18. An anti-theft device for vehicles steered by means of handlebar fixed to a fork accepting a steered wheel, comprising first means of connection with the handlebar, second means of connection with the fork, means of coupling between the said first and second connection means, and a two-position actuation device, a position of use of the vehicle locking any relative movement between the said first and second connection means and an anti-theft position allowing free rotation between the said first and second connection means, wherein the anti-theft device further comprises travel limiting means for limiting the magnitude of the said free rotation to an arc of a circle, arranged inside the said anti-theft device.

19. The anti-theft device of claim 18, wherein the said travel limiting means comprise a stop pin and a hollow in an arc of a circle arranged respectively inside the said cylindrical housing of the stem head and on the said column head.

* * * * *